United States Patent
Zhan et al.

(10) Patent No.: US 7,767,166 B2
(45) Date of Patent: Aug. 3, 2010

(54) PACKED-BED RADIAL-FLOW NON-THERMAL PLASMA REACTOR

(75) Inventors: Rijing Zhan, San Antonio, TX (US); Andy M. Anderson, San Antonio, TX (US); Thomas R. Gabehart, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 1143 days.

(21) Appl. No.: 11/217,740

(22) Filed: Sep. 1, 2005

(65) Prior Publication Data
US 2006/0087243 A1    Apr. 27, 2006

Related U.S. Application Data

(60) Provisional application No. 60/607,001, filed on Sep. 3, 2004.

(51) Int. Cl.
*B01J 19/08* (2006.01)
(52) U.S. Cl. .................................................. 422/186.04
(58) Field of Classification Search ............. 422/186.04
See application file for complete search history.

(56) References Cited

U.S. PATENT DOCUMENTS

| | | | |
|---|---|---|---|
| 5,746,984 A | 5/1998 | Hoard | 422/169 |
| 5,843,288 A | 12/1998 | Yamamoto | 204/164 |
| 5,904,905 A | 5/1999 | Dolezal et al. | 422/186.04 |
| 6,038,853 A * | 3/2000 | Penetrante et al. | 60/274 |
| 6,322,758 B1 * | 11/2001 | Hall et al. | 422/186.04 |
| 6,471,932 B1 | 10/2002 | Gieshoff et al. | 423/352 |
| 6,474,060 B2 | 11/2002 | Khair | 60/275 |
| 6,645,441 B1 * | 11/2003 | Andrews et al. | 422/186.04 |
| 7,025,939 B1 * | 4/2006 | Hall et al. | 422/186.04 |
| 7,074,370 B2 * | 7/2006 | Segal et al. | 422/186.04 |
| 2003/0150709 A1 | 8/2003 | LaBarge et al. | 204/164 |
| 2004/0042940 A1 * | 3/2004 | Andrews et al. | 422/186.04 |

OTHER PUBLICATIONS

International Preliminary Report on Patentability, PCT/US2005/031522, 5 pages, Mailing Date, Mar. 15, 2007.
International Search Report PCT/US05/31522, 7 pages, Mailing Date Aug. 8, 2006.

* cited by examiner

*Primary Examiner*—Kishor Mayekar
(74) *Attorney, Agent, or Firm*—Chowdhury & Georgakis PC

(57) ABSTRACT

A non thermal plasma reactor for treating gases. The reactor has a tubelike housing, which contains four concentric channels. A central channel is a gas inlet channel. Two inner channels are a non thermal plasma reactor channel and a catalytic channel. The outer channel is a gas outlet channel.

6 Claims, 1 Drawing Sheet

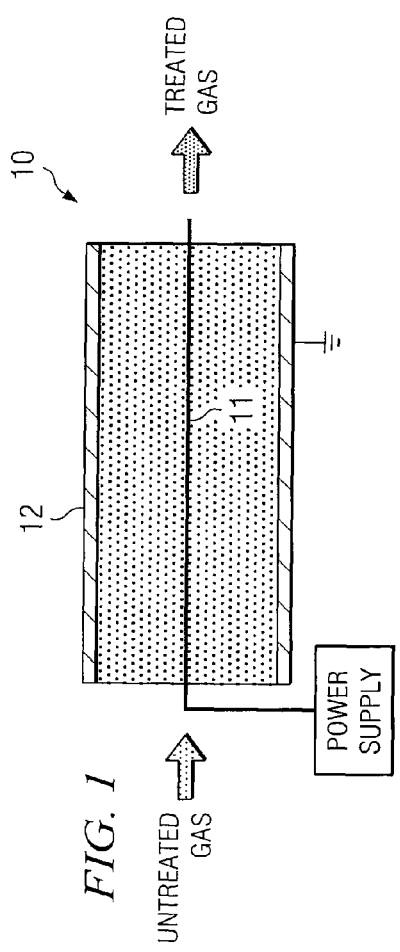
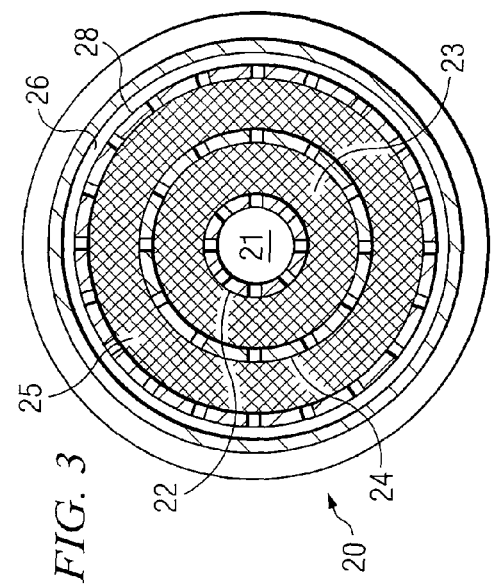
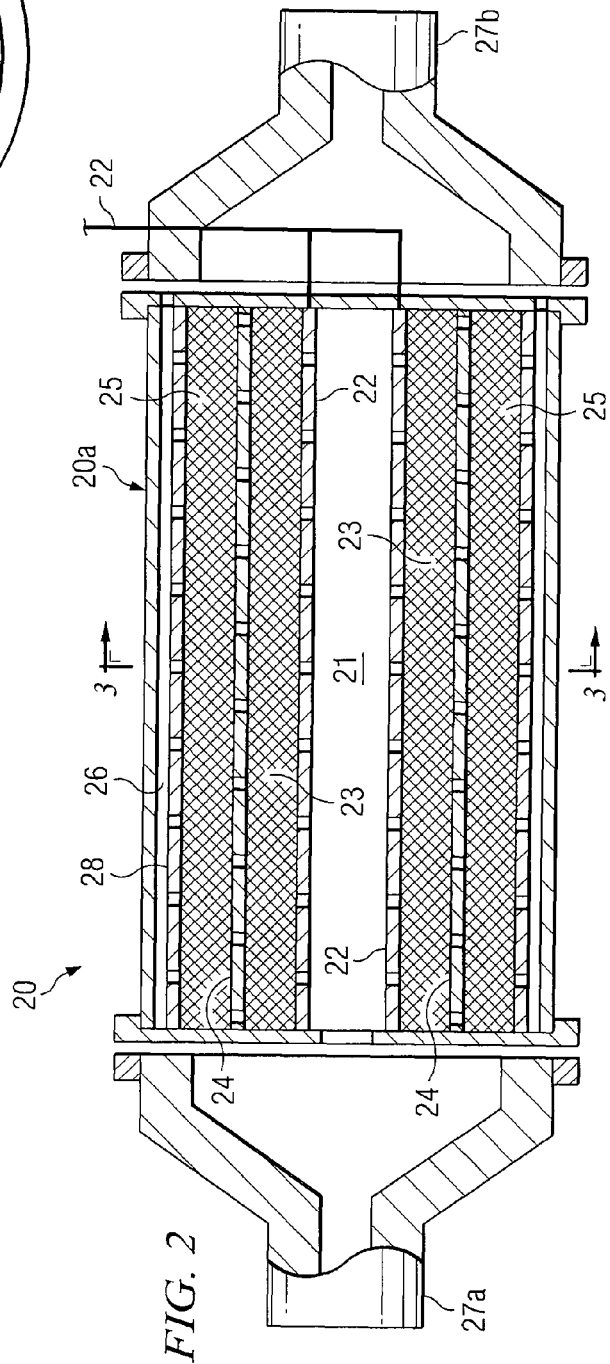

PACKED-BED RADIAL-FLOW NON-THERMAL PLASMA REACTOR

RELATED APPLICATION

This application claims priority to U.S. provisional patent application No. 60/607,001, entitled "Packed-Bed, Radial-Flow Non-Thermal Plasma Reactor" filed on Sep. 3, 2004, the contents of which are hereby incorporated in their entirety by reference.

TECHNICAL FIELD OF THE INVENTION

This invention relates to non-thermal plasma reactors, and more particularly to a packed-bed radial-flow design for a non-thermal plasma reactor.

BACKGROUND OF THE INVENTION

Non-thermal plasma reactors have been used to treat contaminated gases, such as vehicle exhaust emissions. A plasma is a gas (such as vehicle exhaust gas) that has been at least partially ionized by passing an electrical current through it. The plasma becomes chemically reactive because of interaction between electrons and gas molecules, which causes the gas molecules to split into atoms known as radicals. The plasma couples the electrical energy into favorable chemistry for oxidizing and/or reducing contaminants to a more manageable form.

A characteristic of non-thermal plasma versus thermal plasma applications is that the non-thermal plasma has cool ions and neutrals. Electrons are energized, with typical applied voltage being in a range of 1-10 eVs.

The uses for non-thermal plasma reactors are not limited to treating contaminated gases. The same principles can be applied to produce a useful and desired gas species from a source gas. Various applications of non-thermal plasma reactors include cleaning polluted air, enhancing engine combustion, and surface modification or decontamination.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 illustrates the general principle of operation of a plasma reactor.

FIG. 2 is a cut away view of a radial flow plasma reactor in accordance with the invention.

FIG. 3 is a cross sectional view of the reactor of FIG. 2.

DETAILED DESCRIPTION OF THE INVENTION

FIG. 1 illustrates the basic principle of operation of a non-thermal plasma reactor 10. It operates by generating an electric field between two electrodes 11 and 12. The gas travels between the electrodes to create a non-thermal plasma. The plasma causes chemical reactions to destroy pollutants or to produce useful species, depending on the application of the reactor 10.

FIG. 2 is a cutaway view of a plasma reactor 20 in accordance with the invention. FIG. 3 shows reactor 20 in cross section.

For purposes of this description, reactor 20 is described in terms of application for treating diesel engine exhaust gas. For this application, reactor 20 is useful to treat NOx and particulate emissions. Examples of other potential applications of reactor 20 are treatment of urea or ammonia in a selective catalytic reduction system, for emissions in flue gas at power plants or waste incineration plants, and gas treatment for various chemical reaction processes.

As explained below, reactor 20 has a generally cylindrical housing 20a that contains four concentric channels. Other "tubelike" shapes are possible, with "tubelike" being meant in the most general sense to include cross sectional shapes that are not necessarily circular. Housing 20a is non permeable to gas, such that all gas enters and exits reactor 20 via an inlet aperture 27a and outlet aperture 27b located at opposing ends of housing 20a. The ends of housing 20a may be designed for in-line installation in a flow line, such as an exhaust pipe or other gas conduit.

The inner and outer channels of reactor 20 are a gas inlet channel 21 and a gas outlet channel 26, respectively. The two middle channels provide a chemical catalytic reactor channel 25 adjacent to a non thermal plasma reactor channel 23.

Reactor 20 has a radial flow design, which results in a lower pressure drop of gas flowing through reactor 20. The design is compact, which reduces the space requirements of reactor 20. The design also permits the gas flow direction to be reversed if desired.

Gas enters via inlet 27a into the central channel 21. The outer boundary of channel 21 is a cylindrical conductive screen 22. Screen 22 also serves as the high voltage electrode, having means for connection to a voltage source.

A packed-bed non thermal reactor channel 23 is immediately outside inlet channel 21. Channel 23 may be filled with a various non catalytic and/or dielectric materials. Examples of suitable dielectric materials are ceramic or glass beads. The packing provides an increased surface area, and causes more radicals to be generated. Channel 23 can also be a pellet or honeycomb design. In other embodiments, the packing material could be catalytic material.

The outside boundary of channel 23 is a conductive screen 24. Screen 24 serves as the ground electrode, and has appropriate means for connection to ground.

A catalytic reactor channel 25 is located outside the reactor channel 23. Channel 25 is filled with catalytic material, which may vary depending on the application of reactor 20. For diesel engine exhaust treatment applications, examples of suitable catalysts are three-way catalysts, lean NOx trap catalysts, selective catalytic reduction catalysts. Filters such as diesel particulate filters or traps could also be used for channel 25.

The radial flow proximity of reactor channel 23 and catalyst channel 25 minimizes the distance between these two elements of reactor 20. This enables the freshly activated radicals to exist in the catalyst bed, greatly improving system efficiency.

If desired for structural support, catalytic reactor channel 25 may also be bounded by a screen 28. The gas radially exits reactor channel 25 into a gas flow exit channel 26, where it then forms a linear flow to exit the reactor via outlet 27b.

Outlets 27a and 27b are apertures in end plates of housing 20a. The housing and end plates need not be conductive, and may be any material of suitable durability and strength for the intended application and environment of use.

What is claimed is:

1. A radial flow non-thermal plasma reactor for treating a gas, comprising:

a tubed shaped housing with an input end and an output end;

a central channel within the housing, operable to receive the gas from the input end;

a first electrode screen bounding the outside of the central channel and operable as a high voltage electrode;

a first inner channel concentric with the central channel, operable to receive the gas after the gas flows radially through the first electrode screen;

wherein the first inner channel is a non-thermal plasma reactor comprising a dielectric and/or non catalytic material;

a second electrode screen bounding the outside of the first inner channel and operable as a ground electrode;

a second inner channel concentric with the first inner channel, operable to receive the gas after the gas flows radially through the second electrode screen;

wherein the second inner channel comprises a catalytic material that is operable to react with radicals activated in the first inner channel;

a third screen bounding the outside of the second inner channel and not acting as an electrode;

an outer channel operable to receive the gas after the gas flows radially through the third screen, and further operable to channel the gas to the output end of the housing.

2. The reactor of claim 1, wherein the reactor is operable to treat engine exhaust emissions.

3. The reactor of claim 1, wherein the second inner channel comprises a three-way catalytic material for treating automotive exhaust.

4. The reactor of claim 1, wherein the second inner channel comprises a lean NOx trap catalytic material for treating automotive exhaust.

5. The reactor of claim 1, wherein the second inner channel comprises a selective reduction catalytic material for treating automotive exhaust.

6. The reactor of claim 1, wherein the second inner channel comprises a catalyzed diesel particulate filter.

* * * * *